United States Patent
Minami

(10) Patent No.: US 8,284,442 B2
(45) Date of Patent: Oct. 9, 2012

(54) IMAGE PROCESSING SYSTEM WITH MAXIMUM MAGNIFICATION IMAGE DATA GENERATION SECTION AND PREVIEW EDITING

(75) Inventor: Takahiro Minami, Osaka (JP)

(73) Assignee: Kyocera Document Solutions Inc. (JP)

( * ) Notice: Subject to any disclaimer, the term of this patent is extended or adjusted under 35 U.S.C. 154(b) by 932 days.

(21) Appl. No.: 12/357,889

(22) Filed: Jan. 22, 2009

(65) Prior Publication Data

US 2009/0201542 A1 Aug. 13, 2009

(30) Foreign Application Priority Data

Feb. 13, 2008 (JP) .................................. 2008-032122

(51) Int. Cl.
*G06F 15/00* (2006.01)
*G06K 1/00* (2006.01)
*G06K 15/02* (2006.01)
*G06F 3/12* (2006.01)

(52) U.S. Cl. ........................................ 358/1.2; 358/1.13

(58) Field of Classification Search .................. None
See application file for complete search history.

(56) References Cited

U.S. PATENT DOCUMENTS

| | | |
|---|---|---|
| 2002/0097436 A1 | 7/2002 | Yokoyama et al. |
| 2002/0188635 A1* | 12/2002 | Larson ........................ 707/515 |
| 2003/0002060 A1 | 1/2003 | Yokoyama et al. |
| 2004/0101206 A1* | 5/2004 | Morimoto et al. ............. 382/254 |
| 2008/0013112 A1 | 1/2008 | Yokoyama et al. |

FOREIGN PATENT DOCUMENTS

| | | |
|---|---|---|
| JP | A-2002-208018 | 7/2002 |
| JP | 2005-242814 A | 9/2005 |
| JP | 2005-275849 A | 10/2005 |
| JP | A-2007-188238 | 7/2007 |

OTHER PUBLICATIONS

Office Action dated Dec. 13, 2011 issued in corresponding JP Patent Application No. 2008-032122 (not attached).

* cited by examiner

*Primary Examiner* — Douglas Tran
(74) *Attorney, Agent, or Firm* — Ostrolenk Faber LLP

(57) ABSTRACT

An image processing system readily provides a client PC with preview of a target image for printing or transmission. In accordance with a request from a client PC, a server requests a MFP to generate base image data by reducing the size of an original image and to transmit information of image editing contents available for the MFP to the server. In accordance with the requests from the server, the MFP subsequently provides the base image data and necessary information to the server. Then, the server provides the client PC with a preview window to display the image data obtained by reducing the size of the base image data and an image editing window to display image editing contents available for the MFP.

5 Claims, 10 Drawing Sheets

IMAGE PROCESSING SYSTEM WITH MAXIMUM MAGNIFICATION IMAGE DATA GENERATION SECTION AND PREVIEW EDITING

CROSS-REFERENCE TO RELATED APPLICATIONS

This application claims priority under 35 U.S.C. §119 to Japanese Patent Application No. 2008-032122 filed on Feb. 13, 2008. The entire disclosure of Japanese Patent Application No. 2008-032122 is hereby incorporated herein by reference.

BACKGROUND OF THE INVENTION

1. Field of the Invention

The present invention generally relates to an image processing system for executing image processing, and more specifically to an image processing system configured to provide a client device with a preview image.

2. Background Art

Generally, users want to look at a printing preview of a document/image before the document/image is actually printed out by image forming apparatuses. In response to this demand, a variety of apparatuses have been conventionally proposed.

For example, Japan Patent Application Publication No. JP-A-2005-242814 discloses processing for displaying a printing preview result on a display unit (i.e., a liquid-crystal display (LCD)) provided in a multifunction peripheral (MFP).

Furthermore, Japan Patent Application Publication No. JP-A-2005-275849 discloses processing for extracting strings from obtained image data with optical character recognition (OCR) processing and simultaneously editing the extracted strings in an MFP.

According to the above-mentioned publications, a user is required to approach the MFP to confirm visually a preview screen of an image to be printed out. When plural users want to confirm the printed image simultaneously, or when a user wants to perform other operations with the MFP, the MFP is not capable of concurrently executing a plurality of tasks for meeting the users' demands. Consequently, it has been difficult for the conventional image forming apparatuses to enhance a user's working efficiency.

Accordingly, aspects of the present invention have been created to solve the above-mentioned problems occurring in the conventional practice, and to produce an image processing system for allowing users to refer separately to a preview image.

In view of the above, it will be apparent to those skilled in the art from this disclosure that there exists a need for an improved image processing system. This invention addresses this need in the art as well as other needs, which will become apparent to those skilled in the art from this disclosure.

SUMMARY OF THE INVENTION

An aspect of the present invention relates to an image processing system. The image processing system includes an image processing section, a preview generation section, and a preview providing section. The image processing section is configured to process an original image. The preview generation section is configured to generate preview image data from the original image. The preview image data are used to display a preview image for the processing on a client apparatus. The preview providing section is configured to provide the preview image data to the client apparatus.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

An image processing system 100 of an embodiment of the present invention will be hereinafter explained with reference to the attached drawings.

1-1. Summary of Image Processing System 100

Figure 1:
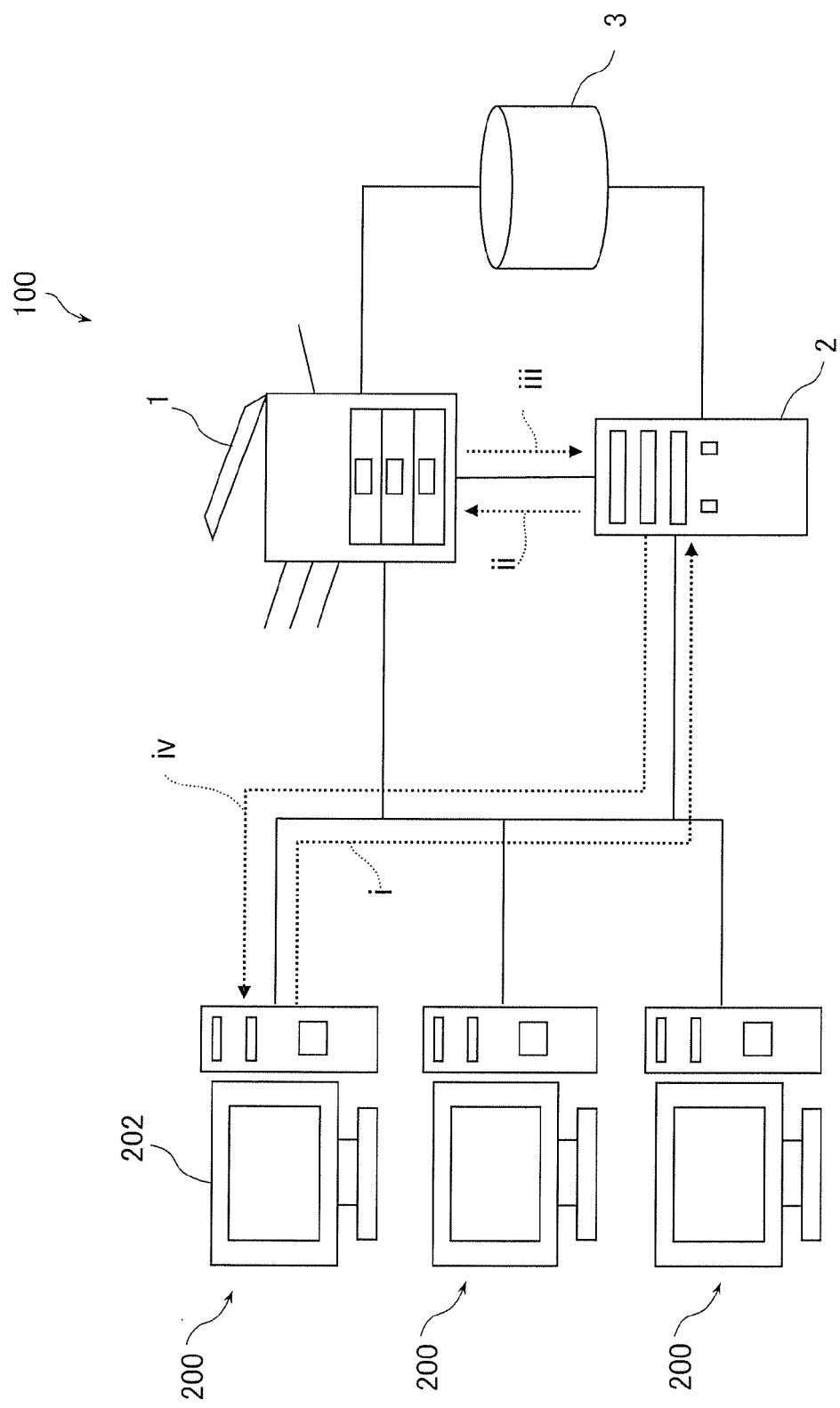
FIG. 1 is a view of a diagram illustrating an overview of an image processing system according to a preferred embodiment of the present invention.

FIG. 1 illustrates an overview of the image processing system 100 connected to a plurality of client PCs 200. As illustrated in FIG. 1, the image processing system 100 includes a multifunction peripheral (MFP) 1, a server 2, and a storage device 3. The MFP 1, the server 2, and the storage device 3 are connected to each other. Additionally, they are connected to the client PCs 200, respectively. Note that dashed arrows "i" to "iv" indicate directions of information transmission between elements.

In the present application, the phrase "two devices/apparatuses are connected" means that the devices/apparatuses are configured to communicate with each other through a communication network. In this case, a single or plurality of devices/apparatuses may be further connected between the two devices/apparatuses. Additionally, examples of the communication network include the Internet, an intranet, a LAN, an ISDN, a CATV communication network, a telephone network, and a satellite communication network.

The MFP 1 may be connected to at least the server 2 and the storage device 3. The server 2 may be connected to at least the client PCs 200.

Configurations of the devices/apparatuses in FIG. 1 will be hereinafter specifically explained.

1-2. MFP 1

The MFP 1 is an example of an image processing apparatus. The MFP 1 is configured to function as a copier, a printer, a facsimile machine, and the like.

Figure 2:
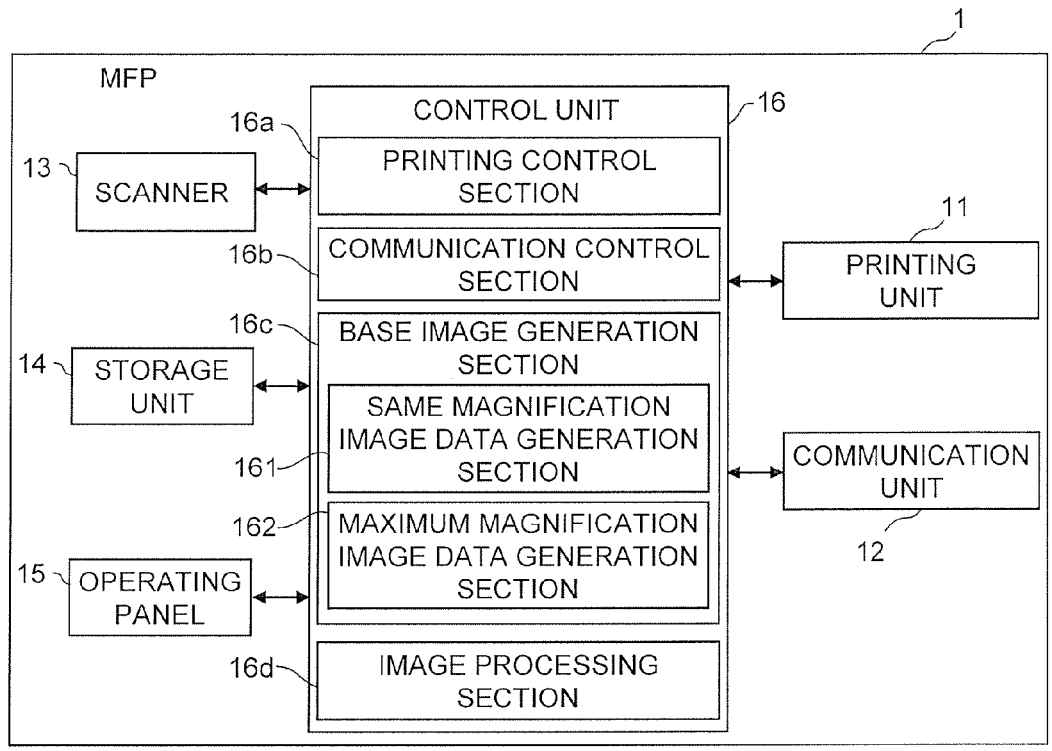
FIG. 2 is a view of a block diagram illustrating main elements of a multifunction peripheral of the image processing system.

FIG. 2 is a view of a block diagram illustrating main elements of the MFP 1. As illustrated in FIG. 2, the MFP 1 includes a printing unit 11, a communication unit 12, a scanner 13, a storage unit 14, an operating panel 14, a control unit 16, and the like. Additionally, the MFP 1 includes paper cassettes to store paper for printing, a platen to dispose a manuscript, a fax modem, and a discharge tray to dispose discharged printed paper. These elements are not illustrated in the figure.

The printing unit 11 is an example of an image forming section that forms an image onto a recording medium in accordance with image data. The printing unit 11 employs the electro-photographic technology. The printing unit 11 is configured to print an image onto a sheet of paper as the recording medium. The printing unit 11 may be replaced by an ink-jet image forming unit. Additionally, a sheet of paper may be replaced by a film as the recording medium. Furthermore, the printing unit 11 includes a paper transport section to select one from a plurality of kinds of paper and transporting the selected one.

The communication unit 12 is an example of a transmission section. The communication unit 12 is a two-way communication interface for communicating with an external apparatus.

The scanner 13 includes a light source, a variety of optical elements (e.g., a lens and a mirror), and an image sensor. The scanner 13 is configured to obtain data of an image on a manuscript.

Thus, an obtained unprocessed image (e.g., an image on a manuscript) is hereinafter referred to as an "original image," and the data of the original image are hereinafter referred to as the "original image data." The original image data are a target for printing/transmission. The original image data are used for generating an after-mentioned preview image. Additionally, the original image data may be stored in an external apparatus outside the MFP 1 (e.g., the storage device 3). In this case, the MFP 1 is allowed to cause the communication unit 12 to obtain the original image data from the external apparatus.

The storage unit 14 is configured to store a variety of information such as the original image data.

The operating panel 15 includes a touch panel and hard keys. The touch panel includes a touch sensor and a display panel to display an image. The operating panel 15 receives an instruction inputted by a user.

The control unit 16 includes a printing control section 16a, a communication control section 16b, a base image generation section 16c, an image processing section 16d, and the like.

The printing control section 16a is configured to control a printing operation of the printing unit 11 in accordance with a variety of printing conditions. In this case, the printing conditions are operational conditions of the printing unit 11. For example, the printing conditions include "paper size for printing," "aggregate print for printing a plurality of images on a sheet of paper," "position of an image on a sheet of paper," "binding," "color/monochrome printing," and "density of printing." It should be apparent from this disclosure that the printing conditions further include post-processing such as "punch" and "staple."

The printing control section 16a has a default printing condition. However, when any printing condition different from the default is received from an external apparatus through the communication unit 12 or through the operating panel 15 operated by a user, the printing unit 11 is allowed to perform a printing operation in accordance with the newly received printing condition.

The communication control section 16b is configured to cause the communication unit 12 to obtain a variety of information in the MFP 1 and to transmit a variety of information to an external apparatus. The destination of the data transmission is determined based on an instruction from an external apparatus or an instruction received through the operating panel 15.

The base image generation section 16c includes a same magnification image data generation section 161 and a maximum magnification image data generation section 162. As described in the following paragraphs, the same magnification image data generation section 161 is configured to generate same magnification image data by executing reduction processing with respect to an original image while the maximum magnification image data generation section 162 is configured to generate maximum image data by executing reduction processing with respect to the original image. The same magnification image data and the maximum magnification image data are used to generate a preview image. The same magnification image data and the maximum magnification image data may be hereinafter referred to as "base image data." Additionally, it should be noted that the term "same magnification image" or "100% magnification image" hereinafter means an image to be displayed on a predetermined display unit as the image with the same size as the original image.

The image processing section 16d is configured to generate new image data by editing the original image data. In this case, the term "editing" includes change of magnification of an image (i.e., enlargement/reduction in image size), change of color of an image, change of density of an image, rotation of an image, and the like. The edited image data are used for printing performed by the printing unit 11, and is transmitted to an external apparatus through the communication unit 12.

1-3. Server 2

The server 2 is an example of an apparatus provided between the MPP 1 and the client PCs 200.

Figure 3:
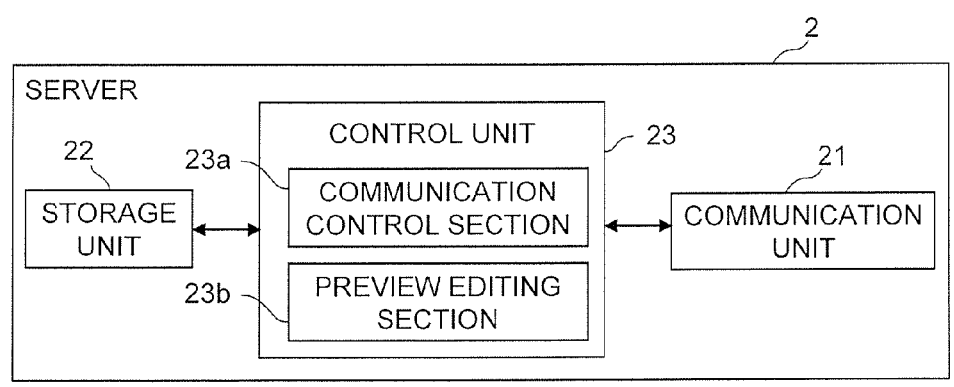
FIG. 3 is a view of a block diagram illustrating main elements of a server of the image processing system

FIG. 3 is a view of a block diagram illustrating main elements of the server 2. As illustrated in FIG. 3, the server 2 includes a communication unit 21, a storage unit 22, a control unit 23, and the like.

The communication unit 21 is an example of a preview providing section. The communication unit 21 is a two-way communication interface that communicates with an external apparatus.

The storage unit 22 is configured to store a variety of information.

The control unit 23 includes a communication control section 23a, a preview editing section 23b, and the like.

The communication control section 23a causes the communication unit 21 to obtain a variety of information in the server 2 and transmit a variety of information to an external apparatus.

The preview editing section 23b is configured to generate data of an image allowed to be displayed on the client PC 200 by processing the base image data. In this case, the image data to be displayed on the client PC 200 are a preview image of an original image to be printed out by the MFP 1.

1-4. Storage Device 3

Referring again to FIG. 1, the storage device 3 is a mass storage device that stores a variety of information. Especially, the storage device 3 stores image data (e.g., the original image data). Additionally, the storage device 3 may store a variety of image data (e.g., the base image data and the preview image data).

1-5. Client PC 200

The client PC 200 is an example of an apparatus that displays a preview image for a user. The client PC 200 has a function of transmitting information (e.g., user's instruction for printing) to the image processing system 100.

Figure 4:
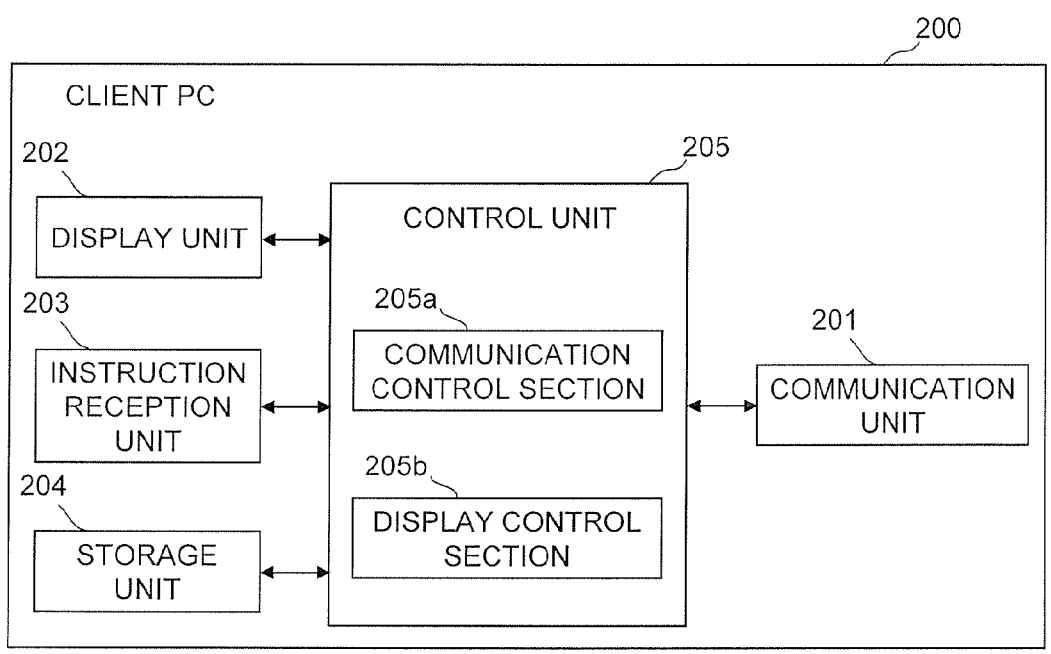
FIG. 4 is a view of a block diagram illustrating main elements of a client PC of the image processing system.

FIG. 4 is a view of a block diagram illustrating main elements of the client PC 200. As illustrated in FIG. 4, the client PC 200 includes a communication unit 201, a display unit 202, an instruction reception unit 203, a storage unit 204, a control unit 205, and the like.

The communication unit 201 is a two-way communication interface that communicates with an external apparatus.

Figure 13:
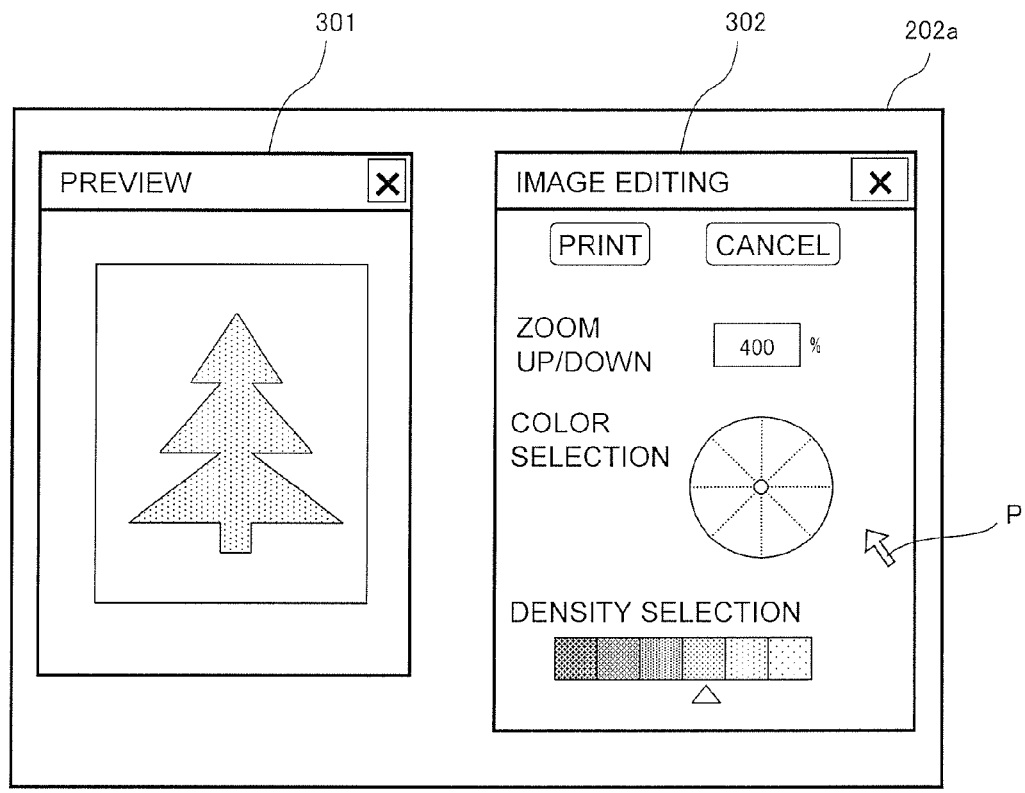
FIG. 13 is a view of a screenshot including a preview window and an image editing window to be displayed on the client PC.

The display unit 202 includes an after-mentioned display panel 202a (see FIG. 13). The display unit 202 is configured to display an image for a user. Any conventional display mechanism (e.g., LCD) may be used as the display unit 202.

The instruction reception unit 203 includes a mouse, hard keys, and the like. The instruction reception unit 203 is configured to receive an instruction inputted by a user.

The storage unit 204 is configured to store a variety of information.

The control unit 205 includes a communication control section 205a, a display control section 205b, and the like.

The communication control section 205a causes the communication unit 201 to obtain a variety of information in the client PC 200 and transmit a variety of information to an external apparatus.

The display control section 205b causes the display unit 202 to display a variety of images. The images displayed on the display unit 202 include a soft key.

1-6. Actions of Elements in Image Processing

Actions of elements in image processing in accordance with a user's instruction will be hereinafter explained with reference to FIGS. 5 to 14.

Figure 5:
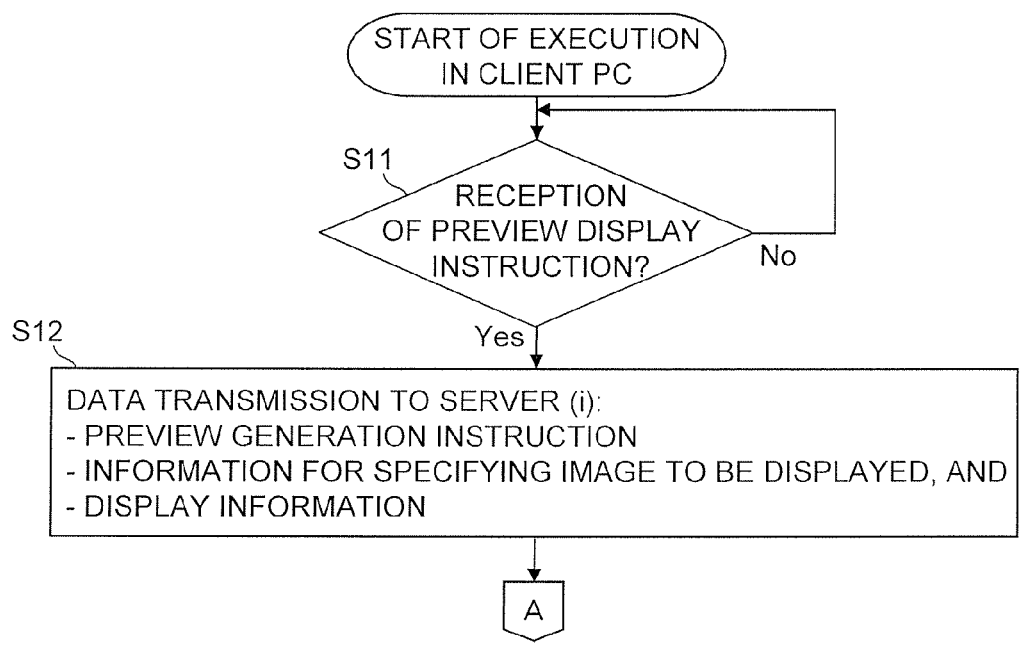
FIG. 5 is a view of a flowchart illustrating processing performed by the client PC in receiving a preview display instruction from a user.
Figure 6:
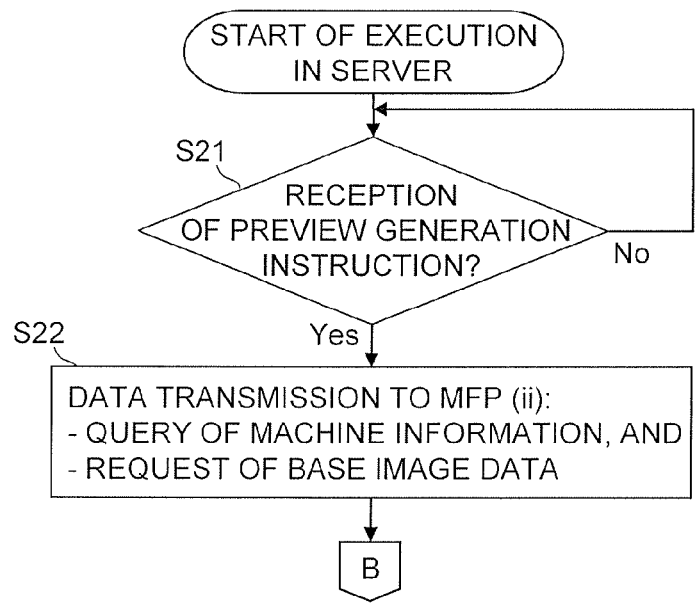
FIG. 6 is a view of a flowchart illustrating processing performed by the server in receiving a preview generation instruction.
Figure 7:
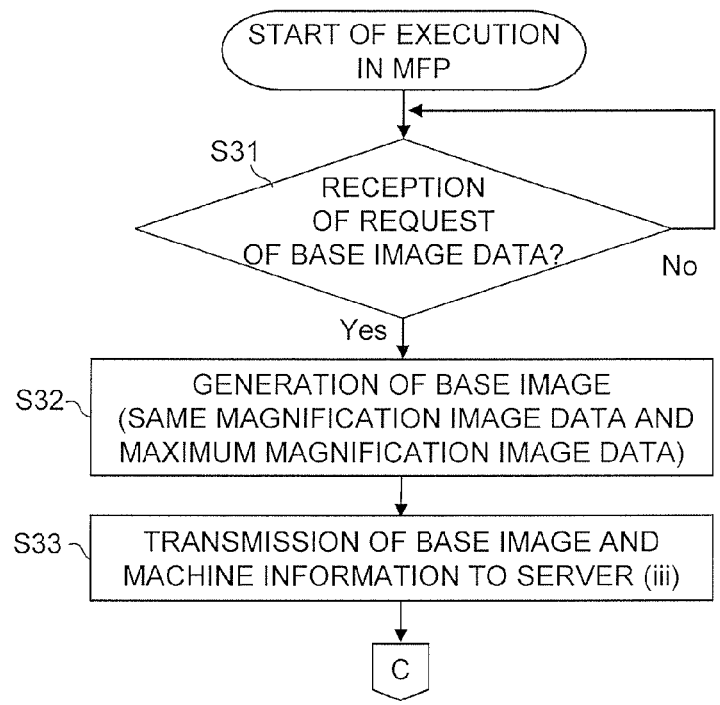
FIG. 7 is a view of a flowchart illustrating processing performed by the MFP in generating base image data.
Figure 8:
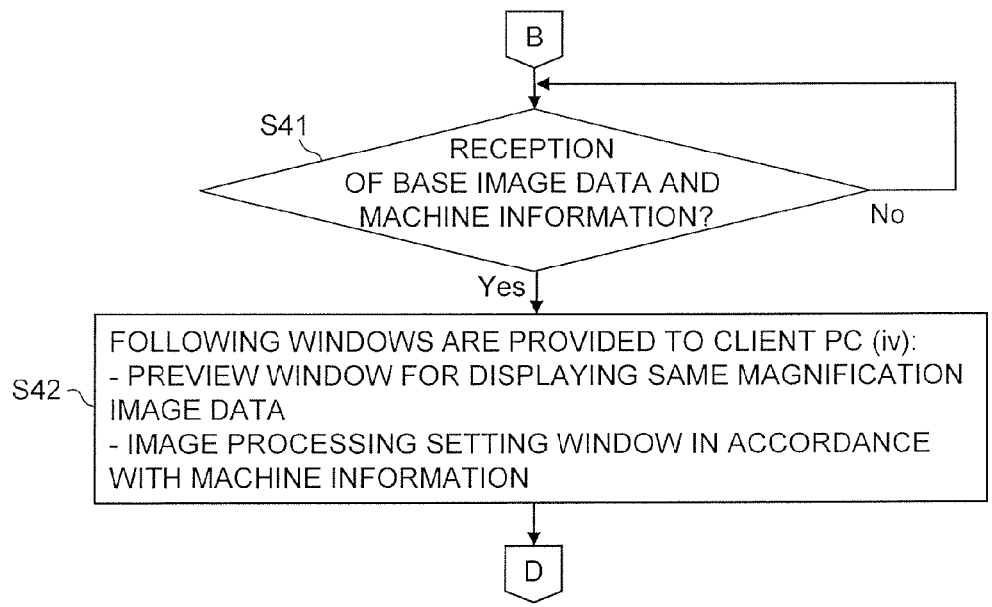
FIG. 8 is a view of a flowchart illustrating processing performed by the server in receiving base image data.

FIGS. 5 to 8 are views of flowcharts illustrating actions elements perform in a series of procedures from a user's request to preview a default preview image. Specifically, FIG. 5 illustrates a series of procedures performed by the client PC 200. FIGS. 6 and 8 illustrate a series of procedures performed by the server 2. FIG. 7 illustrates a series of procedure performed by the MFP 1.

Figure 9:
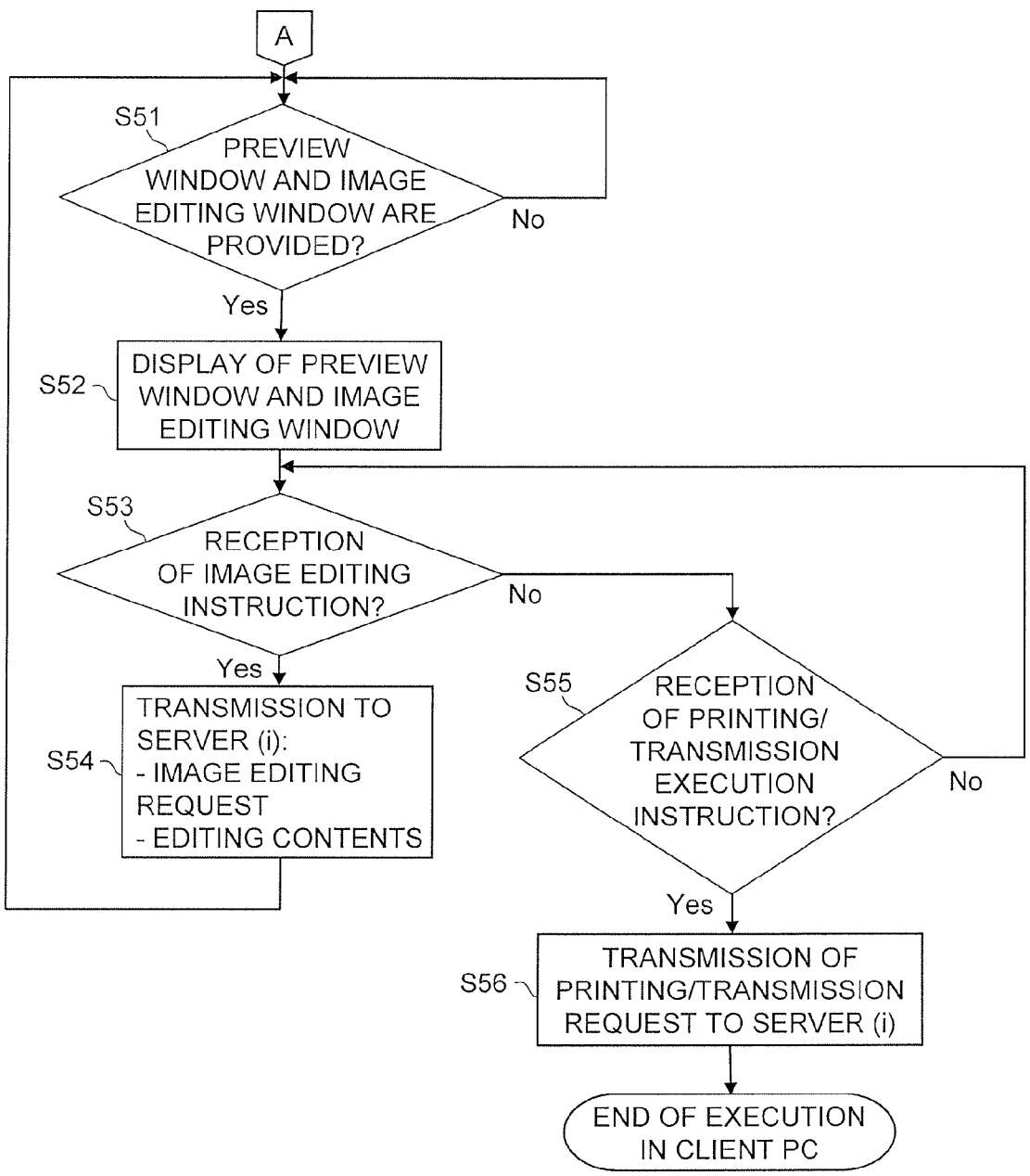
FIG. 9 is a view of a flowchart illustrating processing performed by the client PC after displaying a preview image.
Figure 10:
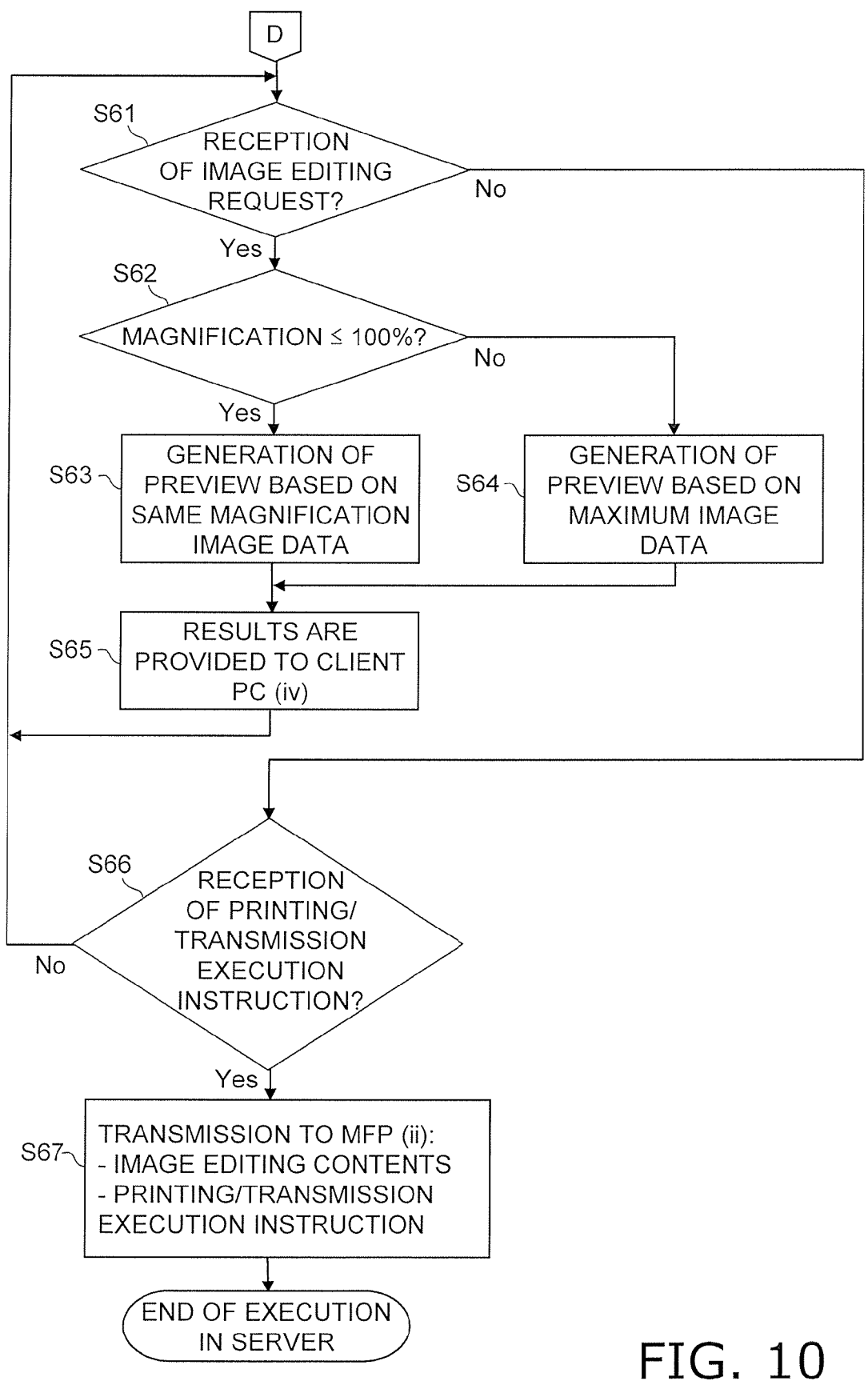
FIG. 10 is a view of a flowchart illustrating processing performed by the server after displaying the preview image.
Figure 11:
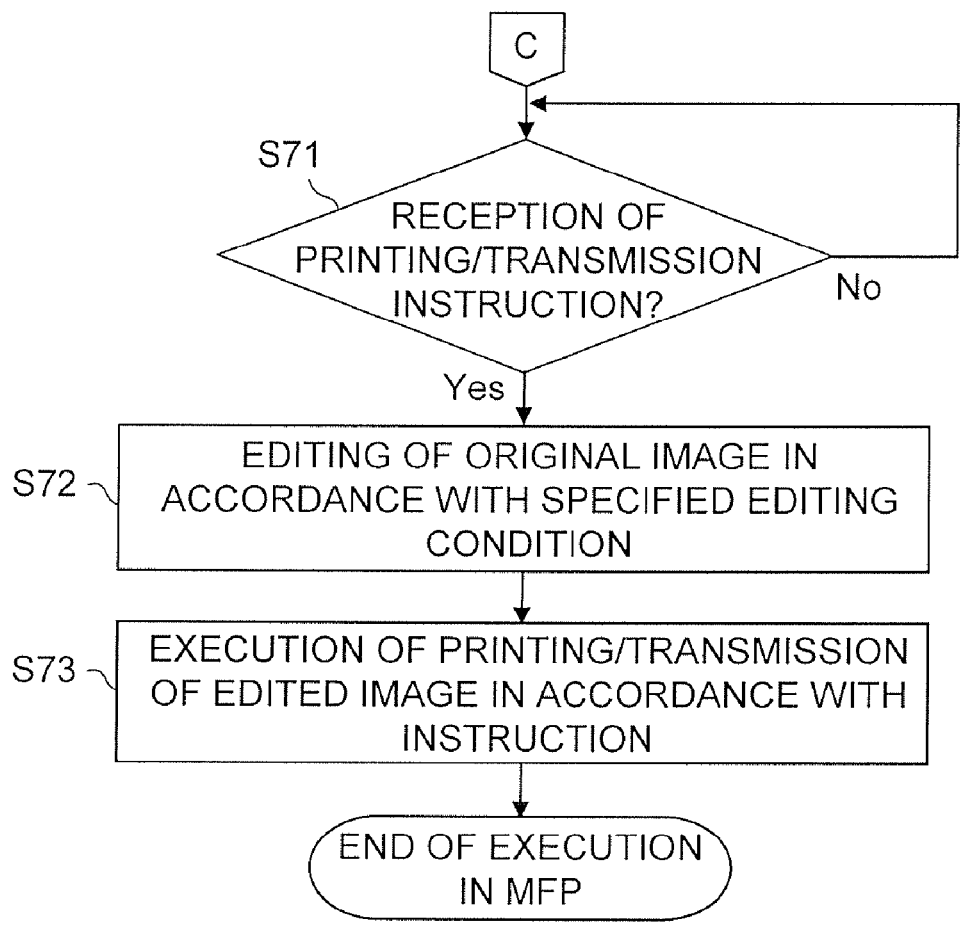
FIG. 11 is a view of a flowchart illustrating processing performed by the MFP.

FIGS. 9 to 11 are views of flowcharts illustrating actions elements perform in a series of procedures including display of preview, editing of an image, and execution of image processing. Specifically, FIG. 9 illustrates a series of procedures performed by the client PC 200. FIG. 10 illustrates a series of procedures performed by the server 2. FIG. 11 illustrates a series of procedures performed by the MFP 1.

Figure 12:
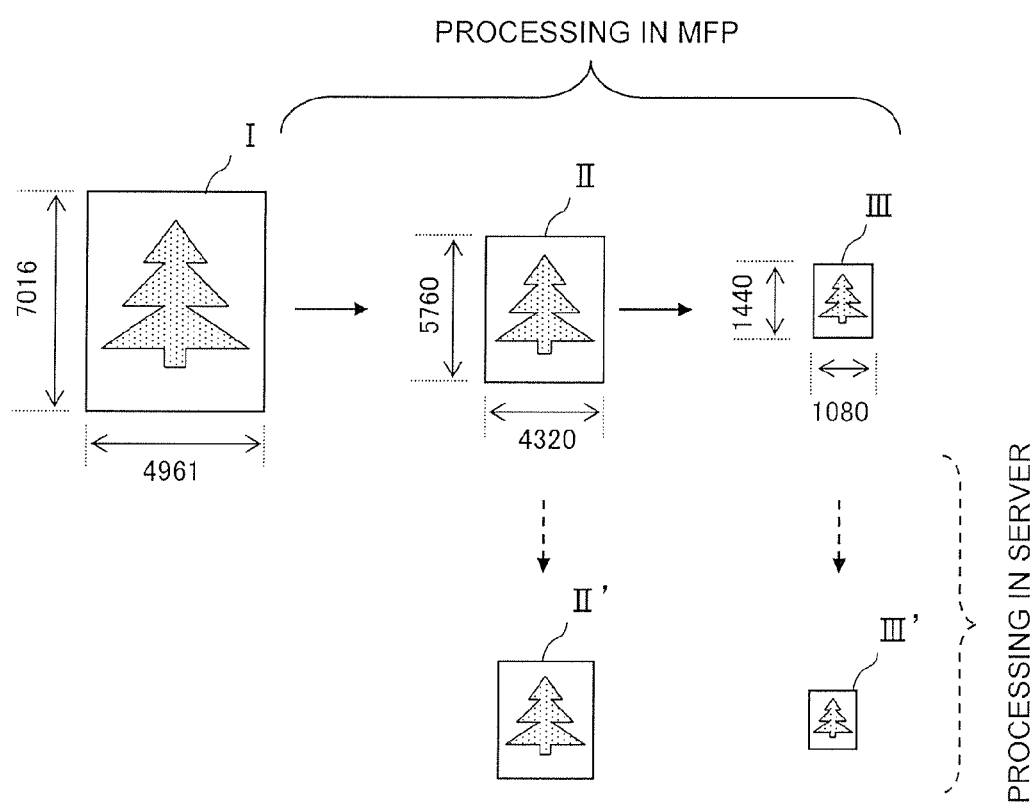
FIG. 12 is a view of a schematic diagram illustrating processing to generate base images in the MFP, and processing to edit the base images in the server.

FIG. 12 is a view of a schematic diagram illustrating base image generation (Step S32 of FIG. 7) performed by the MFP 1 and editing of a preview image (Steps S63 and 64 of FIG. 10) performed by the server 2.

Figure 14:
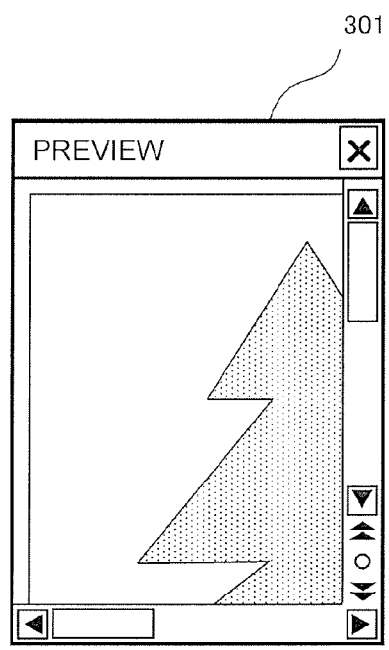
FIG. 14 is a view of a screenshot of the preview window when zoom-up of an image is instructed.

FIG. 13 is a view of a screen shot of a preview window 301 and an image editing window 302 to be displayed on the display panel 202a of the client PC 200. FIG. 14 is a view of a screenshot of the preview window 301 displaying a magnified preview image.

1-6-A Display of Preview Image

The MFP 1 and the server 2 generate a preview image to be displayed on the display unit 202 of the client PC 200. Processing of elements for generating a preview image will be hereinafter explained.

1-6-A1 Request of Preview

As illustrated in FIGS. 4 and 5, when the instruction reception unit 203 of the client PC 200 receives an instruction to display a preview of an target image for printing or transmission (hereinafter referred to as "processing target") from a user (Yes in Step S11), the communication control section 205a transmits a variety of information to the server 2 (Step S12 and Arrow i of FIG. 1). In this case, the variety of information include an instruction of generating preview of the processing target, information for specifying the processing target to be previewed, and information of display on the display unit 202.

For example, the information for specifying the processing target to be previewed includes an image file name, storage location of an image file, and an image file itself. Specifically, referring to FIGS. 1 to 4, based on a user's instruction, the client PC 200 is allowed to specify image data stored in any of the storage media including the storage unit 14 of the MFP 1, the storage unit 22 of the server 2, the storage device 3, and the storage unit 204 of the client PC 200 as a processing target to be previewed.

Additionally, display information includes a variety of sizes of a preview image (e.g., default size and maximum size of a preview image). Note the same magnification image size is herein set as the default size.

1-6-A2 Request of Base Image

As illustrated in FIGS. 1, 3, and 6, when the communication unit 21 of the server 2 receives an instruction to generate a preview from the client PCs 200 (Yes in Step S21), the communication control section 23a causes the communication unit 21 to transmit a query about machine information to the MFP 1, and causes the communication unit 21 to request the MFP 1 to transmit base image data to the server 2 (Step S22 and Arrow ii of FIG. 1).

1-6-A3 Provision of Base Image

As illustrated in FIGS. 1, 2, 5, and 7, when the MFP 1 receives the query and data request from the server 2 (Yes in Step S31), base image data are generated (Step S32).

Specifically, the same magnification image data generation section 161 generates the same magnification image data from the original image data based on the display information included in the information outputted in Step S12. In addition, the maximum magnification image data generation section 162 generates the maximum magnification image data from the original image data based on the display information included in the information outputted in Step S12. In this case, the original image data are specified as the preview display target based on the information outputted in Step S12.

In the example of FIG. 12, original image data I has the following settings: 600 dpi resolution, A4-paper size, and 7016 (vertical)×4961 (horizontal) pixel size. In this case, referring to FIGS. 4 and 12, the image of the A4-paper size is configured to be previewed with the default pixel size of 1440 (vertical)×1080 (horizontal) on the display unit 202. Additionally, the previewed image is allowed to be magnified up to 400% on the display unit 202. When the image of the A4-paper size is previewed with 400% magnification on the display unit 202, the pixel size of the image is set to be 5760 (=1440×4)×4320 (=1080×4).

In this case, the display unit 202 displays an image of 1440×1080 pixel size as an image of the same magnification while displaying an image of 5760×4320 pixel size as an image of the maximum magnification.

As illustrated in FIGS. 2 and 12, the maximum magnification image data generation section 162 reduces the original image data I at magnification of 5760/7016, and generates the maximum magnification image data II of 5760×4320 pixel size. Furthermore, the same magnification image data generation section 161 reduces the maximum magnification image data II at ¼ magnification, and generates the same magnification image data III of 1440×1080 pixel size.

The same magnification image data generation section 161 and the maximum magnification image data generation section 162 may be suitably configured as long as they are set to generate base image data by reducing the original image data. Also, the phrase "by reducing" may be replaced by the term "without magnifying the once-reduced image data." There is no limitation for contents of steps included in the base image data generation processing and the order of the steps. For example, the same magnification image data III may be generated from the maximum magnification image data II or may be directly generated from the original image data I. Additionally, other steps excluding reduction of magnification may be included in the base image data generation processing.

Sizes of the base image data II and III are not specifically limited, and may be suitably set in consideration of a variety of conditions to perform smoothly the subsequent image processing. The conditions include an angle of view and a compression format to allow the server 2 to perform high-speed image processing and to allow the client PC 200 to display a clear preview image easily visually-confirmed by a user. Also, size of the same magnification image data III may be fixed by the image processing system 100 and the client PC 200 (including application), or may be suitably changed to a predetermined size easily viewed by a user. In the present embodiment, this is a parameter determined by the application or the server 2.

When the base image data are generated, the communication control section 16b causes the communication unit 12 to transmit the base image data and the machine information about the MFP 1 to the server 2 (Step S33 and Arrow iii of FIG. 1). The term "machine information" includes a printing condition available for the MFP 1. The printing condition has been explained in the above paragraphs. Note that the base image data and the machine information may not be simultaneously transmitted, and may be separately transmitted.

1-6-A4 Display of Default Preview Image

As illustrated in FIGS. 1, 8, and 13, when the server 2 receives the base image data and the machine information from the MFP 1 (Yes in Step S41), the server 2 opens the preview window 301 and the image editing window 302 (see FIG. 13) based on the information, and feedbacks the result to the client PC 200 (Step S42 and transmission direction iv of FIG. 1). In this case, an image of the same magnification image data III is displayed as a default preview image on the preview window 301.

Referring to FIGS. 3, 4, and 13, it should be apparent from this disclosure that instead of the server 2, the display control section 205b of the client PC 200 may be configured to open the preview window 301 and the image editing window 302 provided from the server 2.

1-6-B Editing and Processing of Image

Following descriptions relates to reception of an image editing instruction received after a user confirmed a preview image, execution of editing of an image in accordance with the instruction, and image processing.

1-6-B1 Reception of Image Editing Instruction

As illustrated in FIGS. 1 and 9 to 13, when the client PC 200 receives windows from the server 2 (Yes in Step S51), the display panel 202a of the client PC 200 displays the preview window 301 and the image editing window 302 (Step S52).

As illustrated in FIG. 13, a preview of an image (i.e., processing target) is displayed in the preview window 301. On the other hand, image editing conditions that are available for the MFP 1 are displayed in the image editing window 302. For example, the image editing window 302 includes a magnification input box (i.e., enlargement/reduction box), a color wheel for selecting a color of an image, density patterns for selecting density of an image. Contents displayed on the image editing window 302 will be suitably changed in accordance with functions of the MFP 1 (i.e., the above-mentioned machine information). A user is allowed to change the editing conditions by operating a pointer P and the like with a mouse or the like.

Referring to FIGS. 1 to 3 and 9 to 13, when the client PC 200 receives the image editing instruction from a user through the image editing window 302 (Yes in Step S53), the communication control section 205a of the client PC 200 causes the communication unit 201 to transmit a request for editing of an image (i.e., change of a printing condition) and contents of editing (i.e., contents of conditional settings) to the server 2 (Step S54 and Arrow i of FIG. 1). When the server 2 receives the request, it executes processing described in after-mentioned paragraphs of 1-6-B2.

After Step S54, the server 2 feedbacks a new preview reflecting the image editing contents to the client PC 200, and the client PC 200 is allowed to receive further an image editing instruction from a user after the user refers to the new preview (Steps S54, S51, 52, and S53 in this sequential order).

For example, the client PC 200 receives an instruction to magnify an image at 400% magnification through the image editing window 302. In this case, the server 2 provides a preview screen four times as large as the default 100% magnification image data to the client PC 200, and the preview screen is displayed on the display panel 202a (see FIG. 14). As illustrated in FIG. 14, a part of the magnified image is not simultaneously displayed on the preview window 301. However, a user is allowed to confirm the hidden part by operating scroll bars.

When the client PC 200 receives a printing/transmission execution instruction from a user (Step S55), the client PC 200 causes the communication unit 201 to transmit the printing/transmission execution instruction to the server 2 (Step S56 and Arrow i of FIG. 1).

1-6-B2 Editing of Preview Image

As illustrated in FIGS. 1, 3, 10, and 12, when the MFP 1 receives an image editing request from the client PC 200 (Yes in Step S61) and the request includes an instruction of editing the image at a magnification equal to or less than 100% (Yes in Step S62), the preview editing section 23b of the server 2 edits the same magnification image data III based on the contents of the instruction (Step S63). In other words, when the specified magnification is 50%, the preview editing section 23b reduces the same magnification image data III at 50% magnification (see FIG. 12), and suitably executes editing in accordance with other conditions. Thus, a preview image data III' is generated.

On the other hand, when the specified magnification is more than 100% (No in Step S63), the preview editing section 23b edits the maximum magnification image data II based on the instruction contents (Step S64). In other words, when the specified magnification is 200%, the preview editing section 23b reduces the maximum magnification image data II at 50% magnification (see FIG. 12) and suitably executes editing in accordance with other conditions. Thus preview image data II' is generated.

As described above, regardless of magnification (enlargement/reduction), the preview editing section 23b generates a preview image by reducing the base image data. As described above, the phrase "by reducing" may be herein replaced by the phrase "without magnifying the once-reduced image data".

Additionally, the preview editing section 23b is allowed to generate preview image data reflecting the image editing instruction from the client PC 200 by executing a variety of editing (e.g., color, density, and rotation of an image) excluding change of magnification (enlargement/reduction).

The server 2 feedbacks the editing result by the preview editing section 23b to the client PC 200 through the communication unit 21 (Step S65 and Arrow iv of FIG. 1). When the client PC 200 receives the editing result, that is, a new preview image, it executes Step S51 and the subsequent steps in the flowchart of FIG. 9 again.

When the server 2 receives a printing/transmission execution instruction from the client PC 200 (Step S66), the communication control section 23a causes the communication unit 21 to transmit the contents of the image editing and the printing/transmission execution instruction to the MFP 1 (Step S67 and Arrow ii of FIG. 1).

1-6-B3 Execution of Printing

As illustrated in FIGS. 1, 2, and 11, the MFP 1 receives the image editing conditions and instructions to execute printing/transmission from the server 2 (Step S71), the MFP 1 causes the sections to perform a variety of processing. For example the MFP 1 causes the image processing section 16d to process (edit) the original image data I in accordance with the received conditions (Step S72), and causes the printing unit 11 to print out the processed image or causes the communication unit 12 to transmit the processed image (Step S73).

As is the case with image editing by the image processing section 16d, image processing such as printing and transmission is executed based on the contents of the image editing instruction. For example, when the printing execution instruction is executed, the printing control section 16a controls a printing operation of the printing unit 11 (e.g., selection of printing paper) while setting the image editing instruction provided by the server 2 to a printing condition.

In the above-mentioned embodiment, printing and data transmission are exemplified as examples of image processing available for the MFP 1. However, the MFP 1 is configured to execute other image processing such as facsimile transmission.

As described above, the image processing system 100 of the present embodiment is configured to provide the client PC 200 with a preview image. Additionally, in generating a preview image, the MFP 1 generates the base image data while the server 2 generates a final review image by editing the base image data. Thus, the server 2 is in charge of a part of preview image generation processing. Accordingly, processing speed will be enhanced and data capacity processed by the MFP 1 will be reduced compared to preview image generation processing executed only by the MFP 1.

Furthermore, as described above, the image processing system 100 is configured to generate a preview image by reducing the size of the original image. For example, when a preview image with 200% magnification of the original image is generated, it is theoretically possible to generate the preview image by magnifying the same magnification image data III at 200% magnification. This is different from the above-mentioned embodiment. In this case, the original image is first reduced and is then magnified. Additionally, reduction of the original image requires resampling processing. Accordingly, deficits arise in spatial frequency of an image. On the other hand, the present embodiment is configured to generate a preview image without magnifying the once-reduced original image. Therefore, it is possible to provide a preview image with fine image quality.

Also, it is possible to form the control unit 16 of the MFP 1, the control unit 23 of the server 2, and the control unit 205 of the client PC 200 by central processing unit (CPU), read-only memory (ROM), random access memory (RAM), and the like. The control units 16, 23, 205 may suitably include other recoding medium as needed. Also, functional sections included in the control units are realized when the CPU reads out and runs programs stored in the ROM. The RAM is allowed to function as a working area of the CPU.

ALTERNATE EMBODIMENTS

Example A

According to an example of the image processing system in the above-mentioned first embodiment, the image processing section 16d, the printing unit 11, and the communication unit 12 of the MFP 1 are configured to function as an image processing section. Additionally, the base image generation section 16c of the MFP 1 and the preview editing section 23b of the server 2 are configured to function as a preview generation section. Furthermore, the communication unit 21 of the server 2 is configured to function as a preview providing section. However, the present invention is not limited to the configuration. For example, all the functional sections of the image processing system may be provided in the image processing apparatus (e.g., MFP 1).

Example B

According to the above-mentioned first embodiment, the preview generation section has a function for reduction processing and a function for editing the reduced image (i.e., preview editing section). Additionally, the MFP 1 executes the function for reduction processing while the server 2 executes the function for editing the reduced image. However, the present invention is not limited to this. For example, a single device (e.g., MFP 1) may be configured to realize a series of processing for generating a final preview image from an original image.

Example C

According to the above-mentioned first embodiment, a user inputs an image editing instruction while referring to a preview image. Accordingly, the instruction is reflected in the preview image. However, the preview image does not necessarily reflect the editing result. It is possible to achieve a working effect by allowing a user to confirm a processing target image at least by displaying the processing target image for a user.

General Interpretation

A used herein, the following directional terms "forward, rearward, above, downward, vertical, horizontal, below, and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device includes hardware and/or software that is constructed and/or programmed to carry out the desired function.

Terms that are expressed as "means-plus function" in the claims should include any structure that can be utilized to carry out the function of that part of the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An image processing system, comprising:
   an image processing apparatus including:
   an image processing section configured to process an original image,
   a same magnification image data generation section configured to generate same magnification image data by executing reduction processing with respect to the original image, the same magnification image data being used for displaying the original image as a same magnification image on a client apparatus, and
   a maximum magnification image data generation section configured to generate maximum magnification image data by executing reduction processing with respect to the original image, the maximum magnification image data being used to display the same magnification image at the maximum magnification on the client apparatus; and
   a server including:
   a preview editing section configured to generate preview image data by editing either the same magnification image data or the maximum magnification image data, the preview image data being used to display a preview image to be processed on the client apparatus, and
   a preview providing section configured to provide the client apparatus with the preview image data.

2. The image processing system according to claim 1, wherein the image processing section is configured to process the original image in accordance with a condition specified by the client apparatus, and the preview editing section is configured to edit the preview image data in accordance with the condition.

3. The image processing system according to claim 2, wherein the preview editing section is configured to execute reduction processing with respect to the same magnification image data in accordance with a first magnification equal to or less than the same magnification when the condition is set to change the size of the original image at the first magnification, and
   the preview editing section is configured to execute reduction processing with respect to the maximum magnification image data in accordance with a second magnification greater than the same magnification when the condition is set to change the size of the original image at the second magnification.

4. The image processing system according to claim 1, wherein the image processing section is an image forming section that forms an image on a recording medium.

5. The image processing system according to claim 1, wherein the image processing section is a transmission section that transmits an image to an external apparatus.

* * * * *